(12) United States Patent
Zhou et al.

(10) Patent No.: US 8,693,567 B2
(45) Date of Patent: Apr. 8, 2014

(54) PRECODING METHOD AND APPARATUS IN MULTIPLE INPUT MULTIPLE OUTPUT SYSTEM

(75) Inventors: Yongxing Zhou, Beijing (CN); Chi Gao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/409,742

(22) Filed: Mar. 1, 2012

(65) Prior Publication Data

US 2012/0163439 A1 Jun. 28, 2012

Related U.S. Application Data

(63) Continuation of application No. PCT/CN2010/076526, filed on Sep. 1, 2010.

(30) Foreign Application Priority Data

Sep. 2, 2009 (CN) .......................... 2009 1 0168949

(51) Int. Cl.
*H04B 7/02* (2006.01)

(52) U.S. Cl.
USPC ........................................ 375/267

(58) Field of Classification Search
USPC .......... 370/210, 329, 338; 375/219, 224, 259, 375/260, 267, 295, 296, 299, 302, 316, 342, 375/347, 349; 455/101, 132–141, 522; 700/53; 704/219, 223
See application file for complete search history.

(56) References Cited

U.S. PATENT DOCUMENTS

| | | | |
|---|---|---|---|
| 2004/0082356 A1 | 4/2004 | Walton et al. | |
| 2008/0260054 A1 | 10/2008 | Myung et al. | |
| 2008/0303699 A1 | 12/2008 | Zhang et al. | |
| 2008/0316935 A1 | 12/2008 | Baln et al. | |
| 2009/0003474 A1 | 1/2009 | Pan et al. | |
| 2009/0023467 A1 | 1/2009 | Huang et al. | |
| 2009/0323841 A1* | 12/2009 | Clerckx et al. | 375/260 |

FOREIGN PATENT DOCUMENTS

| | | |
|---|---|---|
| CN | 101039162 A | 9/2007 |
| CN | 101247208 A | 8/2008 |
| CN | 101282564 A | 10/2008 |
| CN | 101291192 A | 10/2008 |
| CN | 101335558 A | 12/2008 |
| EP | 1786118 A1 | 5/2007 |
| JP | 2005039585 A | 2/2005 |
| WO | WO 2008/021392 A2 | 2/2008 |

OTHER PUBLICATIONS

European Search Report received in European Application No. 10813350.5, dated Jun. 8, 2012, 8 pages.

(Continued)

*Primary Examiner* — Sam K Ahn
*Assistant Examiner* — Shawkat M Ali
(74) *Attorney, Agent, or Firm* — Slater & Matsil, L.L.P

(57) ABSTRACT

Embodiments of the present invention disclose a precoding method and apparatus in a multiple input multiple output system. The method includes receiving a non-constant modulus channel information matrix fed back by a UE; processing the non-constant modulus channel information matrix and removing amplitude information, and obtaining a precoding matrix according to a constant modulus channel information matrix; and precoding data to be sent by using the precoding matrix.

12 Claims, 4 Drawing Sheets

(56) References Cited

OTHER PUBLICATIONS

NXP Semiconductors, Philips, "Feedback and Precoding Techniques for MU-MIMO for LTE-A," 3GPP TSG RAN WG1 Meeting #54, Jeju, South Korea, R1-083244, Aug. 18-22, 2008, 9 pages.

Huawei, "Adaptive Feedback: A New Perspective of the Adaptive Codebook," 3GPP TSG RAN WG1 Meeting #58, Shenzhen, China, R1-093059, Aug. 24-28, 2009, 5 pages.

PCT International Search Report received in Patent Cooperation Treaty Application No. PCT/CN2010/076526, mailed Dec. 2, 2010, 4 pages.

PCT Written Opinion of the International Searching Authority received in Patent Cooperation Treaty Application No. PCT/CN2010/076526, mailed Dec. 2, 2010, 4 pages.

First Chinese Office Action of Chinese Application No. 200910168949.1 mailed Oct. 16, 2012, 11 pages.

\* cited by examiner

PRECODING METHOD AND APPARATUS IN MULTIPLE INPUT MULTIPLE OUTPUT SYSTEM

CROSS-REFERENCE TO RELATED APPLICATIONS

This application is a continuation of International Application No. PCT/CN2010/076526, filed on Sep. 1, 2010, which claims priority to Chinese Patent Application No. 200910168949.1, filed on Sep. 2, 2009, both of which are hereby incorporated by reference in their entireties.

FIELD OF THE INVENTION

The present invention relates to the field of communications technologies, and in particular, to a precoding method and apparatus in a multiple input multiple output system.

BACKGROUND OF THE INVENTION

In mobile communication, a "central evolved NodeB (eNB)—distributed terminals" mode is adopted. In this mode, it is difficult for a mobile terminal to implement coordinated transmission and reception. To facilitate data detection performed by a UE (User Equipment, user equipment) and improve channel capacity, in a downlink point to point system, a MIMO (Multiple Input Multiple Output, multiple input multiple output) precoding technology is generally used in an eNB. The MIMO precoding technology means that the eNB preprocesses, in a case in which CSI (Channel State Information, channel state information) is known, data to be sent.

In the prior art, in an LTE-A (Long Term Evolution-Advanced, Long Term Evolution-Advanced) system, to provide higher cell average/edge/peak spectrum efficiency, the UE needs to send a channel information matrix that approaches a channel status as closely as possible, that is, a non-constant modulus channel information matrix. After receiving the non-constant modulus channel information matrix fed back by the UE, the eNB directly conjugates the non-constant modulus channel information matrix to obtain a precoding matrix, and precodes the data to be sent according to the precoding matrix. However, this causes a loss of transmit power.

SUMMARY OF THE INVENTION

Embodiments of the present invention provide a precoding method and apparatus in a multiple input multiple output system to reduce a loss of transmit power on a transmit antenna. The technical solutions are as follows:

An embodiment of the present invention provides a precoding method in a multiple input multiple output system, where the method includes:

receiving a non-constant modulus channel information matrix fed back by a UE;

obtaining a constant modulus channel information matrix by removing amplitude information of each element in the non-constant modulus channel information matrix, and obtaining a precoding matrix according to the constant modulus channel information matrix; and precoding data to be sent by using the precoding matrix.

An embodiment of the present invention provides a method for feeding back a channel quality indicator, where the method includes:

obtaining a constant modulus channel information matrix by removing amplitude information of each element in a non-constant modulus channel information matrix, and obtaining a precoding matrix according to the constant modulus channel information matrix; and calculating a channel quality indicator CQI according to the precoding matrix, and sending the CQI to an eNB.

An embodiment of the present invention provides a precoding apparatus in a multiple input multiple output system, where the apparatus includes:

a receiving module, configured to receive a non-constant modulus channel information matrix fed back by a UE;

a processing unit, configured to remove amplitude information of each element in the non-constant modulus channel information matrix received by the receiving module, and obtain a precoding matrix according to a constant modulus channel information matrix; and a precoding module, configured to precode data to be sent by using the precoding matrix obtained by the processing module.

An embodiment of the present invention provides an apparatus for feeding back a channel quality indicator, where the apparatus includes:

a processing module, configured to obtain a constant modulus channel information matrix by removing amplitude information of each element in a non-constant modulus channel information matrix, and obtain a precoding matrix according to the constant modulus channel information matrix; and a calculating module, configured to calculate a channel quality indicator CQI according to the precoding matrix obtained by the processing module, and send the CQI to an eNB.

The beneficial effects of the technical solutions provided in the embodiments of the present invention are as follows: The constant modulus channel information matrix is obtained by processing the non-constant modulus channel matrix, that is, by removing the amplitude information of the non-constant modulus channel information matrix and reserving phase information; the precoding matrix is obtained according to the constant modulus channel information matrix; and an accurate CQI is calculated by using the precoding matrix or the data to be sent is precoded by using the precoding matrix. In this way, the eNB obtains an accurate downlink channel quality condition and then performs a corresponding operation according to the accurate downlink channel quality condition, which may improve system performance. Alternatively, transmit antennas are enabled to concurrently send the data to be sent at the maximum transmit power, which reduces the loss of transmit power.

DETAILED DESCRIPTION OF THE EMBODIMENTS

To make the objectives, technical solutions, and advantages of the present invention clearer, the embodiments of the present invention are described in detail below with reference to the accompanying drawings.

Embodiment 1

Figure 1:
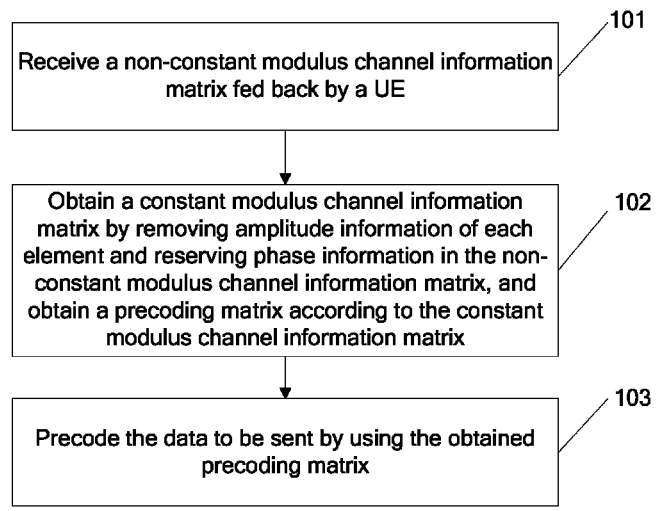
FIG. 1 is a schematic flowchart of a precoding method in a multiple input multiple output system according to a first embodiment of the present invention.

To enable a transmit antenna of an eNB to send data to be sent at the maximum transmit power, and reduce a loss of transmit power, an embodiment of the present invention provides a precoding method in a multiple input multiple output system. Through this precoding method, efficiency of a transmit power amplifier of the eNB may be maintained and a power loss may be reduced. Referring to FIG. 1, the method includes:

101: Receive a non-constant modulus channel information matrix fed back by a UE.

102: Obtain a constant modulus channel information matrix by removing amplitude information of each element and reserving phase information in the non-constant modulus channel information matrix, and obtain a precoding matrix according to the constant modulus channel information matrix.

103: Precode data to be sent by using the obtained precoding matrix.

The beneficial effects of this embodiment of the present invention are as follows: The constant modulus channel information matrix is obtained by removing the amplitude information of each element in the non-constant modulus channel information matrix fed back by the UE, that is, equalizing amplitudes of all elements in the non-constant modulus channel information matrix fed back by the UE, and reserving only the phase information; the precoding matrix is obtained according to the constant modulus channel information matrix; and after the data to be sent is precoded by using the precoding matrix, because the amplitudes of all elements in the precoding matrix are equal, each transmit antenna is capable of concurrently sending the data to be sent at the maximum transmit power without a nonequilibrium factor. In this way, the power loss is reduced.

Embodiment 2

Figure 2:
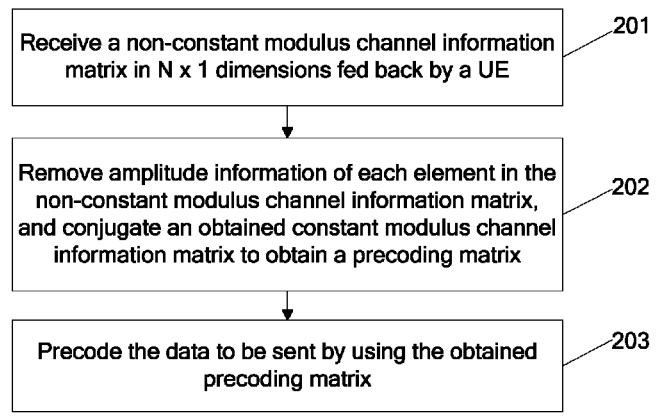
FIG. 2 is a schematic flowchart of a precoding method in a multiple input multiple output system according to a second embodiment of the present invention.

This embodiment of the present invention provides a precoding method in a multiple input multiple output system. Through this precoding method, efficiency of a transmit power amplifier of an eNB may be improved and a power loss may be reduced. Referring to FIG. 2, the method includes:

201: Receive a non-constant modulus channel information matrix fed back by a UE, where the non-constant modulus channel information matrix is in N×1 dimensions, and N indicates that the number of transmit antennas is N.

In this embodiment, the non-constant modulus channel information matrix may be a non-constant modulus channel matrix or a non-constant modulus feature space. When the non-constant modulus channel information matrix is a non-constant modulus channel matrix, in N×1 dimensions, 1 indicates that the number of receive antennas of the UE is 1; when the non-constant modulus channel information matrix is a non-constant modulus feature space, in N×1 dimensions, 1 indicates that a rank of the non-constant modulus feature space is 1, which indicates that throughput is maximized in one-stream transmission.

In this embodiment, the non-constant modulus channel information matrix may also be referred to as non-constant modulus CSI (Channel State Information, channel state information).

In an MIMO precoding technology, the eNB needs to first obtain the non-constant modulus CSI, and then performs precoding according to the non-constant modulus CSI. The non-constant modulus CSI is fed back by the UE to the eNB. Specifically, for the non-constant modulus channel matrix or non-constant modulus feature space fed back by the UE to the eNB, refer to equation (1).

$$c_i = \frac{1}{\sqrt{\sum_{j=1:N} |\alpha_{ij}|^2}} [\alpha_{i1} e^{j\theta_{i1}} \alpha_{i2} e^{j\theta_{i2}} \ldots \alpha_{iN} e^{j\theta_{iN}}]^T \quad (1)$$

In equation (1), $c_i$ is non-constant modulus CSI, that is, a non-constant modulus channel information matrix, $\alpha_{ij}$ is a positive real number and is also amplitude information on a transmit antenna j, $e^{j\theta_{i2}}$ is phase information of $\alpha_{ij}$, j indicates a label of the transmit antenna, and it can be seen from equation (1) that the number of transmit antennas is N. If $c_i$ is a non-constant modulus channel matrix, i does not exist in equation (1), that is, $\alpha_j$ is the amplitude information on the jth transmit antenna. If $c_i$ is a non-constant modulus feature space, i indicates the ith code word, and $\alpha_{ij}$ is the amplitude information on the jth transmit antenna of the ith code word.

To enable the UE maintains good receiving performance, transmit antennas of the eNB sends data to be sent at the maximum transmit power. However, in the prior art, the eNB uses the received non-constant modulus channel information matrix as the precoding matrix to precode the data to be sent. Because the amplitudes of each element in the non-constant modulus channel information matrix may be not always equal, each of the transmit antennas cannot concurrently send the data to be sent at the maximum transmit power. As a result, a power loss occurs on some antennas. For example, a system with two transmit antennas (assume that the total transmit power is 23 dBm and that the maximum transmit power of each transmit antenna is 20 dBm) is used as an example for illustration.

$$c_i = \frac{1}{\sqrt{3}} [1 e^{j\theta_{i1}} \sqrt{2} e^{j\theta_{i2}}]^T \quad (2)$$

As can be seen from equation (2), an amplitude of the second transmit antenna is $\sqrt{2}$, that is, transmit power is 2, and an amplitude of the first transmit antenna is 1, that is, transmit power is 1. The transmit power of the second transmit antenna is twice the transmit power of the first transmit antenna. In this way, when the transmit power of the second transmit is 20 dBm after calculation, the transmit power of the first transmit antenna is reduced by 3 dBm, that is, the transmit power of the first transmit antenna is 17 dBm. The maximum transmit power of each transmit antenna is 20 dBm. Therefore, transmit power of 3 dBm is lost on the first transmit antenna.

According to the method provided in this embodiment of the present invention, after the non-constant modulus channel information matrix fed back by the UE is received; after the processing, the non-constant modulus channel information matrix is changed to a constant modulus channel information matrix, that is, the amplitudes of $\alpha_{ij}$ in the channel information matrix are equalized; and after the channel information matrix with equal amplitudes is used as the precoding matrix to precode the data to be sent, it may be maintained that the transmit antennas of the eNB are capable of sending the data to be sent at the maximum transmit power, which reduces the power loss. The details are as follows:

202: Remove amplitude information of each element in the non-constant modulus channel information matrix, that is, reserve phase information. Conjugate an obtained constant modulus channel information matrix and then use the conjugated constant modulus channel information matrix as a precoding matrix, where a column interchange operation may further be performed on the obtained precoding matrix, or each column vector may be multiplied by a complex number with the modulus of 1, and the precoding matrix on which these operations are performed may still be used as a precoding matrix for precoding the data to be sent.

Specifically, the amplitude information of each element in the non-constant modulus channel information matrix represented by equation (1) is removed, that is, a value of $\alpha_{ij}$ of each element in equation (1) is 1 and only the phase information is reserved, to obtain the constant modulus channel information matrix. The constant modulus channel information matrix is conjugated to obtain a precoding matrix $w_i$, as shown in equation (3).

$$w_i = \frac{1}{\sqrt{N}}[e^{j\theta_{i1}} e^{j\theta_{i2}} \ldots e^{j\theta_{iN}}]^T \qquad (3)$$

It should be noted that the amplitude of each element in equation (1) may be set to a fixed value, for example, 2, 3, or 4, if the amplitude information in equation (1) is equalized; after the amplitude is set to a value other than 1 and a common factor is removed from a numerator and a denominator of equation (1), the amplitude of each element in equation (1), however, is still 1.

203: Precode the data to be sent by using the obtained precoding matrix.

The beneficial effects of this embodiment of the present invention are as follows: The constant modulus channel information matrix is obtained by removing the amplitude information of each element in the non-constant modulus channel information matrix fed back by the UE, that is, equalizing amplitudes of all elements in the non-constant modulus channel information matrix fed back by the UE, and reserving only the phase information; the constant modulus channel information matrix obtained after the processing is conjugated and used as the precoding matrix; and after the data to be sent is precoded by using the precoding matrix, because the amplitudes of all elements in the precoding matrix are equal, taking equation (2) as an example, the first transmit antenna and the second transmit antenna are capable of concurrently sending the data to be sent at the maximum transmit power without a nonequilibrium factor. In this way, the power loss is reduced.

Embodiment 3

Figure 3:
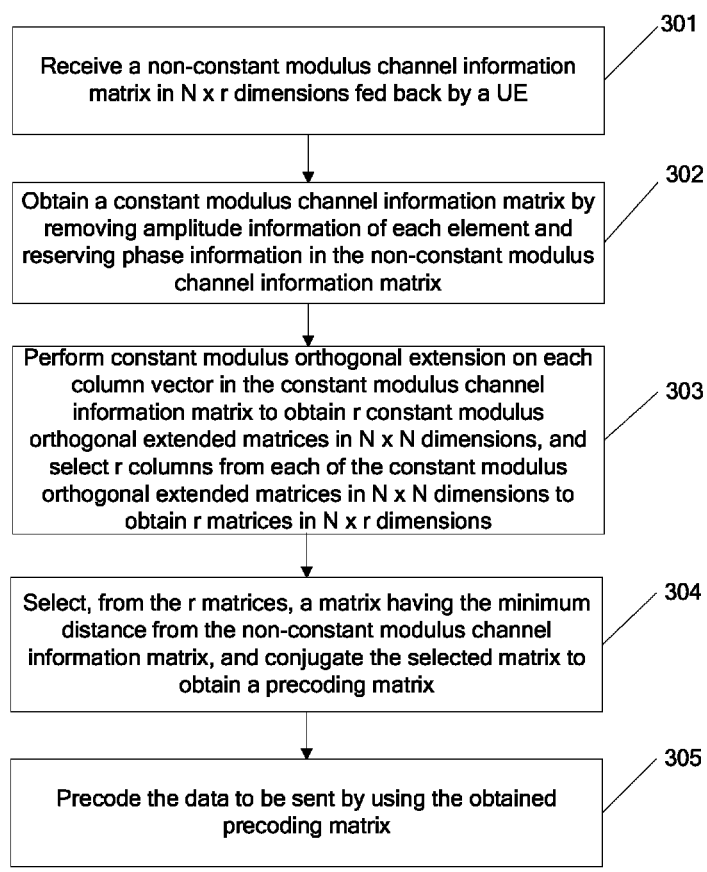
FIG. 3 is a schematic flowchart of a precoding method in a multiple input multiple output system according to a third embodiment of the present invention.

Referring to FIG. 3, an embodiment of the present invention provides a precoding method in a multiple input multiple output system. The method includes:

301: Receive a non-constant modulus channel information matrix fed back by a UE, where the non-constant modulus channel information is in N×r dimensions, N indicates that the number of transmit antennas is N, and r is an integer greater than 1.

Specifically, assume that the non-constant modulus channel information matrix fed back by the UE is $C_i = [c_i^1\ c_i^2 \ldots c_i^r]$. In the non-constant modulus channel information matrix, $c_i^n$ is a column vector with the modulus of 1, and $n = 1, 2, \ldots r$. Each $c_i^n$ has the same expression as equation (1) in the second embodiment, that is $$c_i^n = \frac{1}{\sqrt{\sum_{j=1:N}|\alpha_{ij}|^2}}[\alpha_{i1}e^{j\theta_{i1}}\ \alpha_{i2}e^{j\theta_{i2}}\ \alpha_{iN}e^{j\theta_{iN}}]^T$$

In this embodiment, the non-constant modulus channel information matrix may be a non-constant modulus channel matrix or a non-constant modulus feature space. When the non-constant modulus channel information matrix is a non-constant modulus channel matrix, in N×r dimensions, r indicates that the number of receive antennas of the UE is r; when the non-constant modulus channel information matrix is a non-constant modulus feature space, in N×r dimensions, r indicates that a rank of the non-constant modulus feature space is r, which indicates that throughput is maximized in r-stream transmission.

In this embodiment, the non-constant modulus channel information matrix may also be referred to as non-constant CSI.

302: Obtain a constant modulus channel information matrix by removing amplitude information of each element in the non-constant modulus channel information matrix, that is, reserving phase information.

Specifically, after the processing in this step, assume that the constant modulus channel information matrix corresponding to the non-constant modulus channel information matrix $C_i = [c_i^1\ c_i^2 \ldots c_i^r]$ is $X_i = [x_i^1\ x_i^2 \ldots x_i^r]$. That is, a corresponding $x_i^n$ is obtained by removing the amplitude information of each $c_i^n$ in $C_i$. Each $x_i^n$ in the constant modulus channel information matrix is a column vector with the modulus of 1, and $n = 1, 2 \ldots r$.

303: Perform constant modulus orthogonal extension on each column vector in the obtained constant modulus channel information matrix to obtain r constant modulus orthogonal extended matrices in N×N dimensions, where each constant modulus orthogonal extended matrix in N×N dimensions is P; and select one matrix in N×r dimensions from each of the constant modulus orthogonal extended matrices in N×N dimensions to obtain r matrices in N×r dimensions, where the distance between each of the selected matrices in N×r dimensions and the non-constant modulus channel information matrix is the smallest.

Specifically, constant modulus orthogonal extension is performed on each $x_i^n$ obtained in step 202, that is, one column is extended to N columns.

Assume that each column vector in the constant modulus channel information matrix is $x_i^n$, and that a constant modulus orthogonal extended matrix in N×N dimensions corresponding to each $x_i^n$ is $P_i^n$.

A diagonal matrix $\Lambda_i^n$ corresponding to is obtained if $x_i^n = (\Lambda_i^n \cdot Q)_{any\ one\ column}$, that is, $x_i^n$ is any column in a matrix $(\Lambda_i^n \cdot Q)$, where Q is any constant modulus matrix in N×N dimensions, for example, Q may be a DFT (discrete Fourier transform, discrete Fourier transform) matrix in N×N dimensions.

The diagonal matrix $\Lambda_i^n$ corresponding to is obtained.

$P_i^n$ is obtained according to the obtained diagonal matrix $\Lambda_i^n$ and the constant modulus orthogonal extended matrix $P_i^n = \Lambda_i^n \cdot Q$ in N×N dimensions corresponding to each $x_i^n$.

304: Select, from the r matrices in N×r dimensions, a matrix having the minimum distance from the non-constant modulus channel information matrix, and conjugate the selected matrix to obtain a precoding matrix, where a column interchange operation may further be performed on the obtained precoding matrix, or each column vector may be multiplied by a complex number with the modulus of 1, and the precoding matrix on which these operations are performed may still be used as a precoding matrix for precoding data to be sent.

305: Precode the data to be sent by using the obtained precoding matrix.

It should be noted that the matrix having the minimum distance from the non-constant modulus channel information matrix most similar to $C_i = [c_i^1 \ c_i^2 \ \ldots \ c_i^r]$.

The beneficial effects of this embodiment are as follows: The constant modulus channel information matrix is obtained by processing each column vector in the non-constant modulus channel information matrix in N×r dimensions fed back by the UE to remove the amplitude information of the non-constant modulus channel information matrix, that is, equalizing amplitudes of all elements in the non-constant modulus channel information matrix, and reserving the phase information; constant modulus orthogonal extension is performed on each column vector in the constant modulus channel information matrix to obtain r extended matrices in N×N dimensions; r columns having the minimum distance from the non-constant modulus channel information matrix are selected from each of the extended matrices in N×N dimensions to obtain r matrices in N×r dimensions; and then the matrix having the minimum distance from the non-constant modulus channel information matrix is selected from the r matrices in N×r dimensions, and is then conjugated to obtain the precoding matrix. After the data to be sent is precoded by using the precoding matrix, because the amplitudes of all elements in the precoding matrix are equal, all transmit antennas of an eNB are capable of sending the data to be sent at the maximum transmit power without a nonequilibrium factor. In this way, a power loss is reduced.

Embodiment 4

Figure 4:
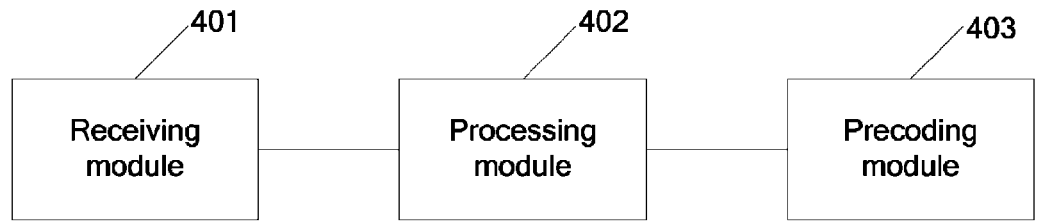
FIG. 4 is a schematic structural diagram of a precoding apparatus in a multiple input multiple output system according to a fourth embodiment of the present invention.

Referring to FIG. 4, an embodiment of the present invention provides a precoding apparatus in a multiple input multiple output system. The apparatus includes:

a receiving module 401, a processing module 402, and a precoding module 403.

The receiving module 401 is configured to receive a non-constant modulus channel information matrix fed back by a UE.

The processing unit 402 is configured to remove amplitude information of each element and reserve phase information in the non-constant modulus channel information matrix received by the receiving module 401, and obtain a precoding matrix according to a constant modulus channel information matrix.

In this embodiment, specific implementation of the processing module 402 may be classified into two types. When the non-constant modulus channel information matrix received by the receiving module 401 is in N×1 dimensions, the processing module 402 is specifically configured to remove amplitude information of each element in the non-constant modulus channel information matrix received by the receiving module 401, that is, reserve phase information; and conjugate an obtained constant modulus channel information matrix to obtain a precoding matrix; and when the non-constant modulus channel information matrix received by the receiving module 401 is in N×r dimensions, the processing module 402 is specifically configured to obtain a constant modulus channel information matrix by removing amplitude information of each element in the non-constant channel information matrix received by the receiving module 401, that is, reserving phase information; perform constant modulus orthogonal extension on each column vector in the obtained constant modulus channel information matrix to obtain r constant modulus orthogonal extended matrices in N×N dimensions; select one matrix in N×r dimensions from each of the constant modulus orthogonal extended matrices in N×N dimensions to obtain r matrices in N×r dimensions, where a distance between each of the selected matrices in N×r dimensions and the non-constant modulus channel information matrix is the smallest; and select, from the r matrices in N×r dimensions, a matrix having the minimum distance from the non-constant modulus channel information matrix, and conjugate the selected matrix to obtain a precoding matrix.

In this embodiment, the non-constant modulus channel information matrix may be a non-constant modulus channel matrix or a non-constant modulus feature space. When the non-constant modulus channel information matrix is a non-constant modulus channel matrix, in N×1 dimensions, 1 indicates that the number of receive antennas of the UE is 1, and in N×r dimensions, r indicates that the number of receive antennas of the UE is r; when the non-constant modulus channel information matrix is a non-constant modulus feature space, in N×1 dimensions, 1 indicates that a rank of the non-constant modulus feature space is 1, which indicates that throughput is maximized in one-stream transmission, and in N×r dimensions, r indicates that the rank of the non-constant modulus feature space is r, which indicates the throughput is maximized in r-stream transmission.

The precoding module 403 is configured to precode data to be sent by using the precoding matrix obtained by the processing module 402.

The constant modulus channel information matrix is obtained by removing the amplitude information of each element in the non-constant modulus channel information matrix fed back by the UE, that is, equalizing amplitudes of all elements in the non-constant modulus channel information matrix fed back by the UE, and reserving only the phase information; the precoding matrix is obtained according to the constant modulus channel information matrix. After the data to be sent is precoded by using the precoding matrix, because the amplitudes of all elements in the precoding matrix are equal, each transmit antenna is capable of concurrently sending the data to be sent at the maximum transmit power without a nonequilibrium factor. In this way, a power loss is reduced.

Embodiment 5

Figure 5:
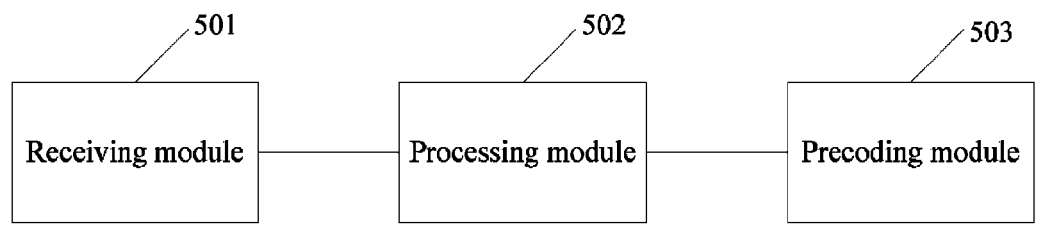
FIG. 5 is a schematic structural diagram of a precoding apparatus in a multiple input multiple output system according to a fifth embodiment of the present invention.

Referring to FIG. 5, an embodiment of the present invention provides a precoding apparatus in a multiple input multiple output system. The apparatus includes:

a receiving module 501, a processing module 502, and a precoding module 503.

The receiving module 501 is configured to receive a non-constant modulus channel information matrix fed back by a UE, where the non-constant modulus channel information matrix is in N×1 dimensions, and N indicates that the number of transmit antennas is N.

In this embodiment, the non-constant modulus channel information matrix may be a non-constant modulus channel matrix or a non-constant modulus feature space. When the non-constant modulus channel information matrix is a non-constant modulus channel matrix, in N×1 dimensions, 1 indicates that the number of receive antennas of the UE is 1; when the non-constant modulus channel information matrix is a non-constant modulus feature space, in N×1 dimensions, 1 indicates that a rank of the non-constant modulus feature space is 1, which indicates throughput is maximized in one-stream transmission.

In this embodiment, non-constant modulus CSI may also be referred to as the non-constant modulus channel information matrix.

In an MIMO precoding technology, an eNB needs to first know the non-constant modulus CSI, and then performs precoding according to the non-constant modulus CSI. The non-constant modulus CSI is fed back by the UE to the eNB. Specifically, for the non-constant modulus channel matrix or non-constant modulus feature space fed back by the UE to the eNB, refer to equation (4).

$$c_i = \frac{1}{\sqrt{\sum_{j=1:N} |\alpha_{ij}|^2}} [\alpha_{i1} e^{j\theta_{i1}} \alpha_{i2} e^{j\theta_{i2}} \ldots \alpha_{iN} e^{j\theta_{iN}}]^T \quad (4)$$

In equation (4), $c_i$ is non-constant modulus CSI, that is, the non-constant modulus channel information matrix, $\alpha_{ij}$ is a positive real number and is also amplitude information on each of the transmit antenna, $e^{j\theta_{i2}}$ is phase information of $\alpha_{ij}$, j indicates a label of a transmit antenna, and it can be seen from equation (4) that the number of transmit antennas is N. If $c_i$ is a non-constant modulus channel matrix, i does not exist in equation (4). If $c_i$ is a non-constant modulus feature space, i indicates the ith code word.

The processing module 502 is configured to remove amplitude information of each element in the non-constant modulus channel information matrix received by the receiving module 501, that is, reserve phase information; and conjugate an obtained constant modulus channel information matrix to obtain a precoding matrix, where a column interchange operation may be performed on the obtained precoding matrix, or each column vector may be multiplied by a complex number with the modulus of 1, and the precoding matrix on which these operations are performed may still be used as a precoding matrix for precoding data to be sent.

Specifically, the amplitude information of each element in the non-constant modulus channel information matrix represented by equation (4) is removed, that is, a value of $\alpha_{ij}$ of each element in the channel information matrix represented by equation (4) is 1 and only the phase information is reserved, to obtain the constant modulus channel information matrix. The constant modulus channel information matrix is conjugated to obtain a precoding matrix $w_i$, as shown in equation (5).

$$w_i = \frac{1}{\sqrt{N}} [e^{j\theta_{i1}} e^{j\theta_{i2}} \ldots e^{j\theta_{iN}}]^T \quad (5)$$

It should be noted that the amplitude of each element in equation (4) may be set to a fixed value, for example, 2, 3, or 4, if the amplitude information in equation (4) is equalized; after the amplitude is set to a value other than 1 and a common factor is removed from a numerator and a denominator of equation (4), the amplitude of each element in equation (4), however, is still 1.

The precoding module 503 is configured to precode the data to be sent by using the precoding matrix obtained by the processing module 502.

The beneficial effects of this embodiment of the present invention are as follows: The constant modulus channel information matrix is obtained by removing the amplitude information of each element in the non-constant modulus channel information matrix fed back by the UE, that is, equalizing amplitudes of all elements in the non-constant modulus channel information matrix fed back by the UE, and reserving only the phase information; the constant modulus channel information matrix obtained after the processing is conjugated and used as the precoding matrix; and after the data to be sent is precoded by using the precoding matrix, because the amplitudes of all elements in the precoding matrix are equal, also taking equation (2) as an example, the first transmit antenna and the second transmit antenna are capable of concurrently sending the data to be sent at the maximum transmit power without a nonequilibrium factor. In this way, a power loss is reduced.

Embodiment 6

Figure 6:
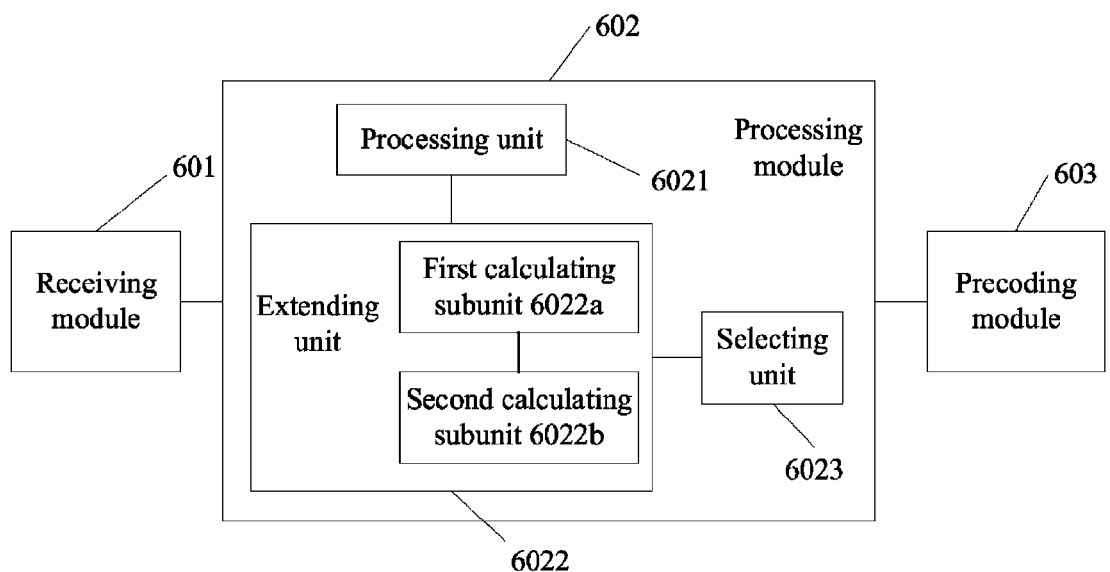
FIG. 6 is a schematic structural diagram of a precoding apparatus in a multiple input multiple output system according to a sixth embodiment of the present invention.

Referring to FIG. 6, an embodiment of the present invention provides a precoding apparatus in a multiple input multiple output system. The apparatus includes:

a receiving module 601, a processing module 602, and a precoding module 603.

The receiving module 601 is configured to receive a non-constant modulus channel information matrix fed back by a UE, where the non-constant modulus channel information is in N×r dimensions, and N indicates that the number of transmit antennas is N.

Specifically, assume that the non-constant modulus channel information matrix fed back by the UE is $C_i = [c_i^1 \ c_i^2 \ldots c_i^r]$. In the non-constant modulus channel information matrix, $c_i^r$ is a column vector with the modulus of 1, and n=1, 2, ... r. Each $c_i^n$ has the same expression as equation (4) in the fifth embodiment.

In this embodiment, the non-constant modulus channel information matrix may be a non-constant modulus channel matrix or a non-constant modulus feature space. When the non-constant modulus channel information matrix is a non-constant modulus channel matrix, in N×r dimensions, r indicates that the number of receive antennas of the UE is r; when the non-constant modulus channel information matrix is a non-constant modulus feature space, in N×r dimensions, r indicates that a rank of the non-constant modulus feature space is r, which indicates that throughput is maximized in r-stream transmission.

In this embodiment, non-constant modulus CSI may also be referred to as the non-constant modulus channel information matrix.

The processing module 602 is configured to obtain a constant modulus channel information matrix by removing amplitude information of each element and reserving phase information in the non-constant modulus channel information matrix received by the receiving module 601; and obtain a precoding matrix according to the constant modulus channel information matrix.

The processing module 601 specifically includes: a processing unit 6021, an extending unit 6022, and a selecting unit 6023.

The processing unit 6021 is configured to obtain the constant modulus channel information matrix by removing the amplitude information of each element and reserving the phase information in the non-constant modulus channel information matrix received by the receiving module 601.

Specifically, after the processing in this step, assume that the constant modulus channel information matrix corresponding to the non-constant modulus channel information matrix $C_i=[c_i^1 \ c_i^2 \ \ldots \ c_i^r]$ is $X_i=[x_i^1 \ x_i^2 \ \ldots \ x_i^r]$. That is, a corresponding $x_i^n$ is obtained by removing the amplitude information of each $c_i^n$ in $C_i$. Each $x_i^n$ in the constant modulus channel information matrix is a column vector with the modulus of 1, and $n=1, 2, \ldots r$.

The extending unit 6022 is configured to perform constant modulus orthogonal extension on each column vector in the constant modulus channel information matrix obtained by the processing unit 6021 to obtain r constant modulus orthogonal extended matrices in N×N dimensions; and select one matrix in N×r dimensions from each of the constant modulus orthogonal extended matrices in N×N dimensions to obtain r matrices in N×r dimensions, where a distance between each of the selected matrices in N×r dimensions and the non-constant modulus channel information matrix is the smallest.

Specifically, the constant modulus orthogonal extension is performed on each $x_i^n$ obtained by the processing unit 6021, that is, one column is extended to N columns.

The extending unit 6022 may specifically includes: a first calculating subunit 6022a and a second calculating subunit 6022b.

Assume that each column vector in the constant modulus channel information matrix is $x_i^n$, and that a constant modulus orthogonal extended matrix in N×N dimensions corresponding to each $x_i^n$ is $P_i^n$.

The first calculating subunit 6022a is configured to obtain a diagonal matrix $\Lambda_i^n$ corresponding to $x_i^n$ according to $x_i^n = (\Lambda_i^n \cdot Q)_{any\ one\ column}$, that is, $x_i^n$ being any column in a matrix $(\Lambda_i^n \cdot Q)$, where Q is any constant modulus matrix in N×N dimensions, for example, Q may be a DFT matrix in N×N dimensions.

The second calculating subunit 6022b is configured to obtain $P_i^n$ according to $P_i^n = \Lambda_i^n \cdot Q$.

The selecting unit 6023 is configured to select, from the r matrices in N×r dimensions obtained by the extending unit 6022, a matrix having the minimum distance from the non-constant modulus channel information matrix, and conjugate the selected matrix to obtain a precoding matrix, where a column interchange operation may further be performed on the obtained precoding matrix, or each column vector may be multiplied by a complex number with the modulus of 1, and the precoding matrix on which these operations are performed may still be used as a precoding matrix for precoding data to be sent.

It should be noted that the matrix having the minimum distance from the non-constant modulus channel information matrix most similar to $C_i$.

The beneficial effects of this embodiment of the present invention are as follows: The constant modulus channel information matrix is processing each column vector in the non-constant modulus channel information matrix in N×r dimensions fed back by the UE to remove the amplitude information of the non-constant modulus channel information matrix, that is, equalizing amplitudes of all elements in the non-constant modulus channel information matrix, and reserving the phase information; constant modulus orthogonal extension is performed on each column vector in the constant modulus channel information matrix to obtain r extended matrices in N×N dimensions; r columns having the minimum distance from the non-constant modulus channel information matrix are selected from each of the extended matrices in N×N dimensions to obtain r matrices in N×r dimensions; and then the matrix having the minimum distance from the non-constant modulus channel information matrix is selected from the r matrices in N×r dimensions, and is then conjugated to obtain the precoding matrix. After the data to be sent is precoded by using the precoding matrix, because the amplitudes of all elements in the precoding matrix are equal, all transmit antennas of an eNB are capable of sending the data to be sent at the maximum transmit power without a nonequilibrium factor. In this way, a power loss is reduced.

Embodiment 7

Figure 7:
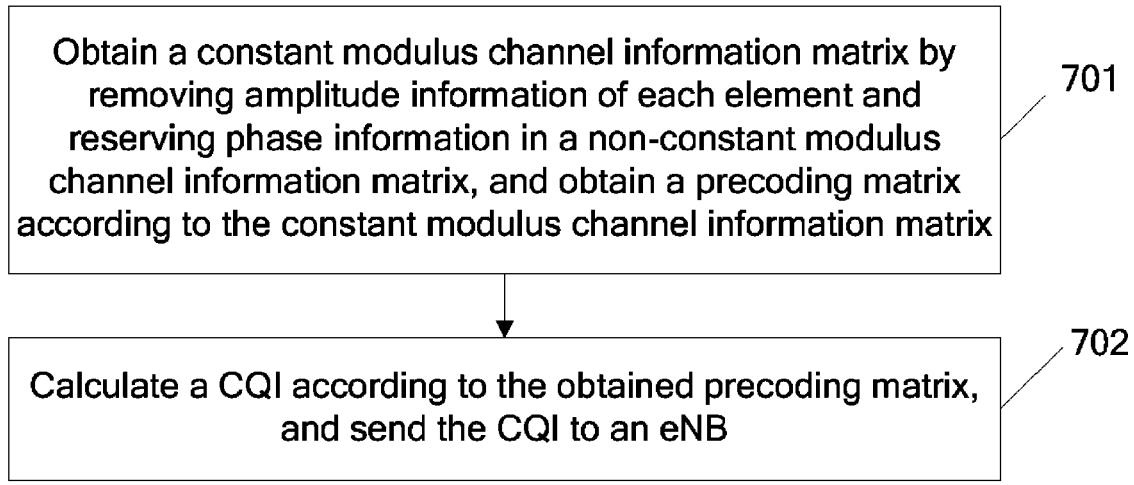
FIG. 7 is a schematic flowchart of a method for feeding back a channel quality indicator according to a seventh embodiment of the present invention.

Referring to FIG. 7, an embodiment of the present invention provides a method for feeding back a channel quality indicator CQI. The method includes:

701: Obtain a constant modulus channel information matrix by removing amplitude information of each element and reserving phase information in a non-constant modulus channel information matrix, and obtain a precoding matrix according to the constant modulus channel information matrix.

In this embodiment, the non-constant modulus channel information matrix may be a non-constant modulus channel matrix or a non-constant modulus feature space. When the non-constant modulus channel information matrix is a non-constant modulus channel matrix, in N×1 dimensions, 1 indicates that the number of receive antennas of the UE is 1, and in N×r dimensions, r indicates that the number of receive antennas of the UE is r; when the non-constant modulus channel information matrix is a non-constant modulus feature space, in N×1 dimensions, 1 indicates that a rank of the non-constant modulus feature space is 1, which indicates that throughput is maximized in one-stream transmission, and in N×r dimensions, r indicates that the rank of the non-constant modulus feature space is r, which indicates that the throughput is maximized in r-stream transmission.

When r is equal to 1, the obtaining the precoding matrix according to the constant modulus channel information matrix is specifically:

conjugating the obtained constant modulus channel information matrix to obtain the precoding matrix.

When r is greater than 1, the method for obtaining the precoding matrix according to the constant modulus channel information matrix can refer to steps 302 to 304 described in the third embodiment, which is not detailed here.

In this embodiment, the non-constant modulus channel information matrix may also be referred to as the non-constant CSI.

702: Calculate a CQI (Channel Quality Indicator, channel quality indicator) according to the obtained precoding matrix, and send the CQI to an eNB.

The CQI is a measurement standard of communication quality of a radio channel quality. A CQI with a high value indicates that a channel has high quality, and a CQI with a low value indicates that a channel has poor quality. A CQI of a channel is able to be calculated by using a performance indicator, for example, an SNR (Signal to Noise Ratio, signal to noise ratio), an SINR (Signal to Interference plus Noise Ratio, signal to interference plus noise ratio), and so on.

Because amplitudes of each element in the non-constant modulus channel information matrix may be not always equal, the CQI obtained by directly performing calculation according to the non-constant modulus channel information matrix may be inaccurate. However, according to this embodiment of the present invention, the non-constant modulus channel information matrix is processed so that the non-constant modulus channel information matrix is changed to a constant modulus channel information matrix; a precoding matrix is obtained according to the constant modulus channel information matrix; and an accurate CQI may be obtained by performing calculation according to the precoding matrix. How to specifically obtain a CQI by performing calculation according to the precoding matrix is common knowledge for those skilled in the art, and therefore not detailed here. The CQI may be a multi-user MIMO CQI, or a single-user MIMO CQI.

The beneficial effects of this embodiment of the present invention are as follows: The constant modulus channel information matrix is obtained by removing the amplitude information of each element in the non-constant channel information matrixd, and the precoding matrix is obtained according to the constant modulus channel information matrix; an accurate CQI is calculated by using the obtained precoding matrix, and then is sent to the eNB. In this way, the eNB may obtain an accurate downlink channel quality condition and then perform a corresponding operation according to the accurate downlink channel quality condition, which improves system performance.

Embodiment 8

Figure 8:
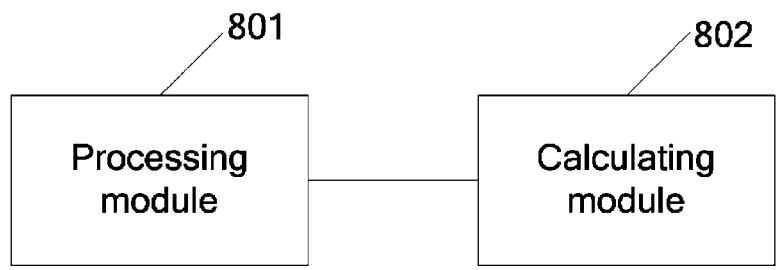
FIG. 8 is a schematic structural diagram of an apparatus for feeding back a channel quality indicator according to an eighth embodiment of the present invention.

Referring to FIG. 8, an embodiment of the present invention provides an apparatus for feeding back a channel quality indicator CQI. The apparatus includes: a processing module 801 and a calculating module 802.

The processing module 801 is configured to obtain a constant modulus channel information matrix by removing amplitude information of each element in a non-constant modulus channel information matrix, and obtain a precoding matrix according to the constant modulus channel information matrix.

In this embodiment, the non-constant modulus channel information matrix may be a non-constant modulus channel matrix or a non-constant modulus feature space. When the non-constant modulus channel information matrix is a non-constant modulus channel matrix, in N×1 dimensions, 1 indicates that the number of receive antennas of the UE is 1, and in N×r dimensions, r indicates that the number of receive antennas of the UE is r; when the non-constant modulus channel information matrix is a non-constant modulus feature space, in N×1 dimensions, 1 indicates that a rank of the non-constant modulus feature space is 1, which indicates that throughput is maximized in one-stream transmission, and in N×r dimensions, r indicates that the rank of the non-constant modulus feature space is r, which indicates that the throughput is maximized in r-stream transmission.

The calculating module 802 is configured to calculate a CQI according to the precoding matrix obtained by the processing module 801, and send the CQI to an eNB.

For an implementation manner of the processing module 801, refer to the processing module 402 in the fourth embodiment, the processing module 502 in the fifth embodiment, and the processing module 602 in the sixth embodiment.

The beneficial effects of this embodiment of the present invention are as follows: The constant modulus channel information matrix is obtained by removing the amplitude information of each element in the non-constant channel information matrix, and the precoding matrix is obtained according to the constant modulus channel information matrix; the accurate CQI is calculated by using the obtained precoding matrix, and then is sent to the eNB. In this way, the eNB may obtain the accurate downlink channel quality condition and then perform a corresponding operation according to the accurate downlink channel quality condition, which improves the system performance.

The embodiments of the present invention may be implemented by using software. A corresponding software program may be stored in a readable storage medium, such as a hard disk, a cache, or a CD-ROM of a computer.

The foregoing describes only exemplary embodiments of the present invention and the present invention is not limited thereto. Any variation, equivalent replacement, or improvement made without departing from the spirit and principle of the present invention shall fall within the protection scope of the present invention.

What is claimed is:

1. A precoding method in a multiple input multiple output (MIMO) system, the method comprising: in an evolved NodeB: receiving, by a processor, a non-constant modulus channel information matrix fed back by a user equipment; obtaining a constant modulus channel information matrix by removing amplitude information of each element in the non-constant modulus channel information matrix; obtaining a precoding matrix according to the constant modulus channel information matrix; and precoding data to be sent by using the precoding matrix, wherein the non-constant modulus channel information matrix is determined according to:

$$c_i = \frac{1}{\sqrt{\sum_{j=1:N} |\alpha_{ij}|^2}} [\alpha_{i1} e^{j\theta_{i1}} \alpha_{i2} e^{j\theta_{i2}} \ldots \alpha_{iN} e^{j\theta_{iN}}]^T$$

wherein $c_i$ is the non-constant modulus channel information matrix, $\alpha_{ij}$ is a positive real number and one of amplitude information on a transmit antenna j and amplitude information on a jth transmit antenna of an ith code word, $e^{j\theta_{i2}}$ is phase information of $\alpha_{ij}$, j indicates a label of the transmit antenna, T represents a transpose operation, and N is a number of transmit antennas.

2. The method according to claim 1, wherein the non-constant modulus channel information matrix comprises a non-constant modulus channel matrix or a non-constant modulus feature space, and is in N×1 dimensions, wherein N indicates the number of transmit antennas, 1 indicates the number of receive antennas when the non-constant modulus channel information matrix is a non-constant modulus channel matrix, and 1 indicates a rank when the non-constant modulus channel information matrix is a non-constant modulus feature space; and
    wherein obtaining the precoding matrix comprises conjugating the obtained constant modulus channel information matrix to obtain the precoding matrix.

3. The method according to claim 1, wherein the non-constant modulus channel information matrix comprises a non-constant modulus channel matrix or a non-constant modulus feature space, and is in N×r dimensions, wherein N indicates the number of transmit antennas, r is an integer greater than 1; r indicates the number of receive antennas when the non-constant modulus channel information matrix is a non-constant modulus channel matrix; and r indicates a rank when the non-constant modulus channel information matrix is a non-constant modulus feature space; and wherein obtaining the precoding matrix comprises:
    performing constant modulus orthogonal extension on a vector of each of r columns in the constant modulus channel information matrix to obtain r constant modulus orthogonal extended matrices in N×N dimensions;

selecting one matrix in N×r dimensions from each of the r constant modulus orthogonal extended matrices in N×N dimensions to obtain r matrices in N×r dimensions, wherein a distance between each of the selected matrices in N×r dimensions and the non-constant modulus channel information matrix is the smallest; and selecting, from the r matrices in N×r dimensions, a matrix having a minimum distance from the non-constant modulus channel information matrix, and conjugating the selected matrix to obtain the precoding matrix.

4. The method according to claim 3, wherein performing the constant modulus orthogonal extension comprises:

obtaining a diagonal matrix $\Lambda_i^n$ if each column vector in the constant modulus channel information matrix satisfies a condition that $x_i^n$ is a column in a matrix ($\Lambda_i^n \cdot Q$), wherein $\Lambda_i^n$ is the diagonal matrix, Q is any constant modulus matrix in N×N dimensions, and n=1, 2, . . . r; and obtaining $P_i^n$ according to the diagonal matrix $\Lambda_i^n$ and a constant modulus orthogonal extended matrix $P_i^n = \Lambda_i^n \cdot Q$ in N×N dimensions corresponding to each $x_i^n$.

5. A method for feeding back a channel quality indicator (CQI), the method comprising: obtaining, by a processor, a constant modulus channel information matrix by removing amplitude information of each element in a non-constant modulus channel information matrix; obtaining a precoding matrix according to the constant modulus channel information matrix; and calculating a CQI according to the precoding matrix, and sending the CQI to an evolved NodeB, wherein the non-constant modulus channel information matrix is determined according to:

$$c_i = \frac{1}{\sqrt{\sum_{j=1:N} |\alpha_{ij}|^2}} [\alpha_{i1} e^{j\theta_{i1}} \alpha_{i2} e^{j\theta_{i2}} \ldots \alpha_{iN} e^{j\theta_{iN}}]^T$$

wherein $c_i$ is the non-constant modulus channel information matrix, $\alpha_{ij}$ is a positive real number and one of amplitude information on a transmit antenna j and amplitude information on a jth transmit antenna of an ith code word, $e^{j\Theta_{i2}}$ is phase information of $\alpha_{ij}$, j indicates a label of the transmit antenna, T represents a transpose operation, and N is a number of transmit antennas.

6. The method according to claim 5, wherein the non-constant modulus channel information matrix is a non-constant modulus channel matrix or a non-constant modulus feature space, and is in N×1 dimensions, wherein N indicates the number of transmit antennas, 1 indicates the number of receive antennas when the non-constant modulus channel information matrix is a non-constant modulus channel matrix, and 1 indicates a rank when the non-constant modulus channel information matrix is a non-constant modulus feature space; and wherein obtaining the precoding matrix comprises conjugating the obtained constant modulus channel information matrix to obtain the precoding matrix.

7. The method according to claim 5, wherein the non-constant modulus channel information matrix is a non-constant modulus channel matrix or a non-constant modulus feature space, and is in N×r dimensions, wherein N indicates the number of transmit antennas and r is an integer greater than 1; r indicates the number of receive antennas when the non-constant modulus channel information matrix is a non-constant modulus channel matrix; and r indicates a rank when the non-constant modulus channel information matrix is a non-constant modulus feature space, and wherein obtaining the precoding matrix according to the constant modulus channel information matrix comprises:

performing constant modulus orthogonal extension on a vector of each of r columns in the constant modulus channel information matrix to obtain r constant modulus orthogonal extended matrices in N×N dimensions;

selecting one matrix in N×r dimensions from each of the r constant modulus orthogonal extended matrices in N×N dimensions to obtain r matrices in N×r dimensions, wherein a distance between each of the selected matrices in N×r dimensions and the non-constant modulus channel information matrix is the smallest;

selecting, from the r matrices in N×r dimensions, a matrix having a minimum distance from the non-constant modulus channel information matrix; and conjugating the selected matrix to obtain the precoding matrix.

8. A precoding apparatus in a multiple input multiple output (MIMO) system, the apparatus comprising: in an evolved NodeB: a receiving module, configured to receive a non-constant modulus channel information matrix fed back by a user equipment; a processing module, configured to obtain a constant modulus channel information matrix by removing amplitude information of each element in the non-constant modulus channel information matrix received by the receiving module and to obtain a precoding matrix according to the constant modulus channel information matrix; and a precoding module, configured to precode data to be sent by using the precoding matrix obtained by the processing module, wherein each of the modules is implemented by using hardware, and wherein the non-constant modulus channel information matrix is determined according to:

$$c_i = \frac{1}{\sqrt{\sum_{j=1:N} |\alpha_{ij}|^2}} [\alpha_{i1} e^{j\theta_{i1}} \alpha_{i2} e^{j\theta_{i2}} \ldots \alpha_{iN} e^{j\theta_{iN}}]^T$$

wherein $c_i$ is the non-constant modulus channel information matrix, $\alpha_{ij}$ is a positive real number and one of amplitude information on a transmit antenna j and amplitude information on a jth transmit antenna of an ith code word, $e^{j\Theta_{i2}}$ is phase information of $\alpha_{ij}$, j indicates a label of the transmit antenna, T represents a transpose operation, and N is a number of transmit antennas.

9. The apparatus according to claim 8, wherein the non-constant modulus channel information matrix is a non-constant modulus channel matrix or a non-constant modulus feature space, and is in N×1 dimensions, wherein N indicates the number of transmit antennas, 1 indicates the number of receive antennas when the non-constant modulus channel information matrix is a non-constant modulus channel matrix, and 1 indicates a rank when the non-constant modulus channel information matrix is a non-constant modulus feature space; and wherein the processing module is specifically configured to obtain the constant modulus channel information matrix by removing the amplitude information of each element in the non-constant modulus channel information matrix received by the receiving module, and to conjugate the constant channel information matrix to obtain the precoding matrix.

10. The apparatus according to claim 8, wherein the non-constant modulus channel information matrix is a non-constant modulus channel matrix or a non-constant modulus feature space, and is in N×r dimensions, wherein N indicates the number of transmit antennas and r is an integer greater than 1; r indicates the number of receive antennas when the non-constant modulus channel information matrix is a non-constant modulus channel matrix; and r indicates a rank when the non-constant modulus channel information matrix is a non-constant modulus feature space, and wherein processing module comprises:

a processing unit, configured to obtain the constant modulus channel information matrix by removing amplitude information of each element in the non-constant modulus channel information matrix received by the receiving module;

an extending unit, configured to perform constant modulus orthogonal extension on a vector of each of r columns in the constant modulus channel information matrix to obtain r constant modulus orthogonal extended matrices in N×N dimensions; and to select one matrix in N×r dimensions from each of the r constant modulus orthogonal extended matrices in N×N dimensions to obtain r matrices in N×r dimensions, wherein a distance between each of the selected matrices in N×r dimensions and the non-constant modulus channel information matrix is the smallest; and a selecting unit, configured to select, from the r matrices in N×r dimensions obtained by the extending unit, a matrix having a minimum distance from the non-constant modulus channel information matrix, and conjugate the selected matrix to obtain the precoding matrix.

11. The apparatus according to claim 10, wherein the extending unit comprises:

a first calculating subunit, configured to calculate and obtain a diagonal matrix $\Lambda_i^n$ on a basis that each column vector in the constant modulus channel information matrix is any column in a matrix ($\Lambda_i^n \cdot Q$), wherein n=1, 2, ..., r, and Q is any constant modulus matrix in N×N dimensions; and a second calculating subunit, configured to obtain $P_i^n$ according to a constant modulus orthogonal extended matrix $P_i^n = \Lambda_i^n \cdot Q$ in N×N dimensions corresponding to each $x_i^n$.

12. An apparatus for feeding back a channel quality indicator (CQI), comprising: a processing module, configured to obtain a constant modulus channel information matrix by removing amplitude information of each element in a non-constant modulus channel information matrix, and to obtain a precoding matrix according to the constant modulus channel information matrix; and a calculating module, configured to calculate a CQI according to the precoding matrix obtained by the processing module, and send the CQI to an evolved NodeB, wherein each of the modules is implemented by using hardware, and wherein the non-constant modulus channel information matrix is determined according to:

$$c_i = \frac{1}{\sqrt{\sum_{j=1:N} |\alpha_{ij}|^2}} [\alpha_{i1} e^{j\theta_{i1}} \alpha_{i2} e^{j\theta_{i2}} \ldots \alpha_{iN} e^{j\theta_{iN}}]^T$$

wherein $c_i$ is the non-constant modulus channel information matrix, $\alpha_{ij}$ is a positive real number and one of amplitude information on a transmit antenna j and amplitude information on a jth transmit antenna of an ith code word, $e^{j\Theta_{i2}}$ is phase information of $\alpha_{ij}$, j indicates a label of the transmit antenna, T represents a transpose operation, and N is a number of transmit antennas.

* * * * *